United States Patent [19]

Kaltwasser

[11] 4,434,998

[45] Mar. 6, 1984

[54] REAR AXLE FOR VEHICLES ESPECIALLY MOTOR VEHICLES

[75] Inventor: Helmut Kaltwasser, Eltville, Fed. Rep. of Germany

[73] Assignee: General Motors Corporation, Detroit, Mich.

[21] Appl. No.: 253,030

[22] Filed: Apr. 10, 1981

[30] Foreign Application Priority Data

Apr. 26, 1980 [DE] Fed. Rep. of Germany ....... 3016248

[51] Int. Cl.³ .............................................. B60G 11/20
[52] U.S. Cl. ..................................... 280/721; 280/689
[58] Field of Search ...................... 280/96.1, 660, 666, 280/668, 689, 721, 723

[56] References Cited

U.S. PATENT DOCUMENTS

| | | | |
|---|---|---|---|
| 3,159,390 | 12/1964 | Stiglich | 280/721 |
| 3,767,224 | 10/1973 | Schneeweiss | 280/723 |
| 3,843,149 | 10/1974 | Whitley, Jr. | 280/721 |
| 4,113,278 | 9/1978 | Rissberger | 280/689 |
| 4,322,062 | 3/1982 | Aleck | 280/721 |

FOREIGN PATENT DOCUMENTS

| | | | |
|---|---|---|---|
| 2103399 | 8/1972 | Fed. Rep. of Germany | 280/723 |
| 2361009 | 6/1975 | Fed. Rep. of Germany | 280/723 |

*Primary Examiner*—Richard A. Bertsch
*Attorney, Agent, or Firm*—Dean L. Ellis

[57] ABSTRACT

An automotive vehicle rear axle includes longitudinally rearwardly extending control arms pivoted at their forward end on the body and carrying road wheels at their rearward end, a transverse beam connected to each control arm between the body pivot and wheel axis thereof, the connections permitting relative rotation between each control arm and the respective connected end of the transverse beam along an axis of the latter which extends obliquely to the control arm.

4 Claims, 4 Drawing Figures

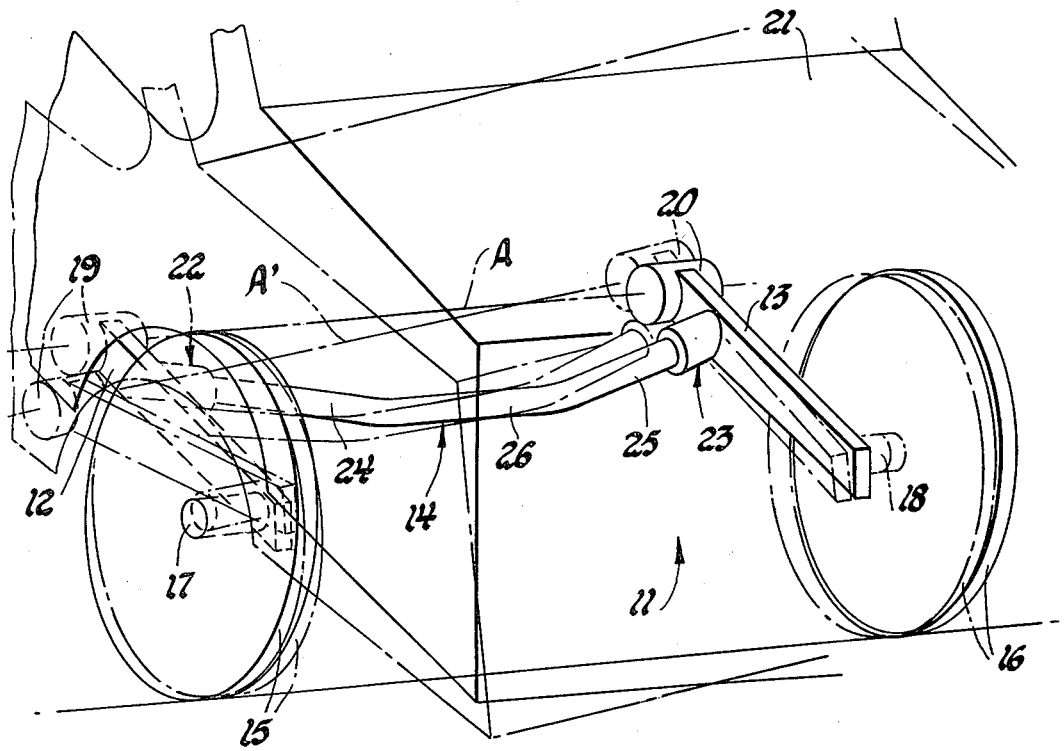
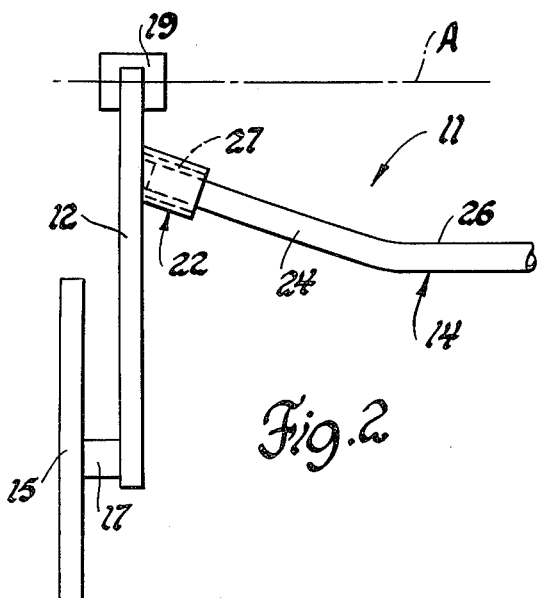
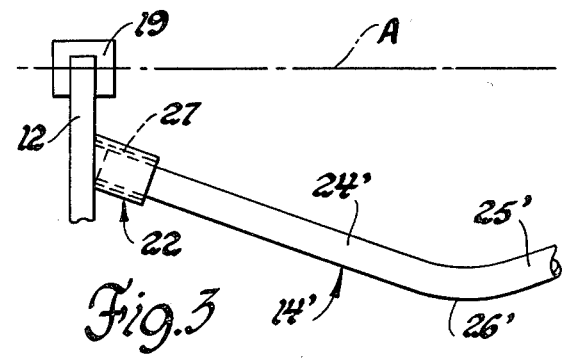
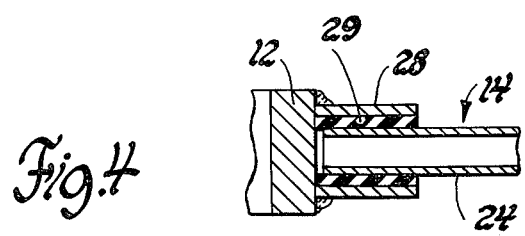

REAR AXLE FOR VEHICLES ESPECIALLY MOTOR VEHICLES

The invention relates to rear axles for motor vehicles, especially rear axles for motor vehicles having wheels that are suspended on rigid longitudinal control arms connected to one another by a flexurally rigid transverse member.

In such suspensions, the longitudinal control arms are connected to the vehicle chassis by way of elastic bushings, and the transverse member is disposed rearwardly of the bushings of the control arms and ahead of the wheel spindles, and is attached at a right angle to the control arms. By virtue of the flexurally rigid nature of the transverse member, and because of its connection to the longitudinal guide arms in a manner whereby relative angular movement is prevented, the change in the individual wheel camber angles as a result of body roll is effectively reduced as contrasted with a wheel suspension comprised exclusively of longitudinal control arms.

Whenever the transverse member is rigidly connected to the longitudinal guide arms, it must exhibit a sufficient degree of torsional elasticity in order to allow for ride comfort through a limited amount of relative displacement between the longitudinal guide arms occurring with independent spring deflections of the wheels. A desirable roll stabilizing effect is also gained, depending in degree on the torsional elasticity of the transverse member. However, as such torsional elasticity is increased, camber control may be compromised.

It has been proposed that the transverse member be mounted at right angles at its control arm attachment points without torsional load resistance, thus eliminating the above-mentioned stabilizing effect. Camber control during body roll is thus retained to the full extent, but other devices must be employed for roll stabilization.

It is the object of the instant invention to further enhance the beneficial characteristics of longitudinal control arm rear axles with transverse beams such that during independent spring deflection of the wheels as prevails during body roll, not only is wheel camber control retained but it is improved, and wheel toe-in is also effected in a favorable manner.

In accordance with the instant invention, the objective is realized with a transverse member offset at its midportion with respect to the transverse plane between those points at which the transverse member is connected to the longitudinal control arms, with the end portions of the transverse member extending for attachment to the longitudinal arms at an angle other than 90°. While retaining the aformentioned camber control, the wheels are guided in their independent spring deflections to swing primarily about the longitudinal axes of the end portions of the transverse member, which axes are disposed at an oblique angle to the transverse plane as above-mentioned. Such disposition of the transverse member affords a beneficial change in toe-in in a selected direction.

Other characteristics of the transverse member developed according to the invention relate to the midportion connecting the rectilinear end portions which are connected at an oblique angle to the longitudinal guide arms, such midportion either being straight or being of a bow-shaped configuration and having a predetermined radius of curvature.

In a specific embodiment of the invention, the transverse member midportion is offset in the direction of the connecting axis of the wheel spindles, so that the end portions of the transverse member extend from the longitudinal guide arms rearwardly at an oblique angle. This arrangement of the end portions has the effect that the wheels are guided in a fashion similar to that found in an axle of the oblique or semi-trailing suspension arm type. As known, the favorable characteristics of this type of axle, when subjected to individual wheel spring deflections, cause an increase in camber angle in the direction toward negative camber and reduction in toe-in.

As a further feature of the invention, the transverse member may be in the form of a torsionally rigid tube rotatably mounted at its ends in the longitudinal guide arms. The transverse member has optimum flexural or bending strength while employing only a limited amount of material. The rotatable end connections, as by means of bearing sleeves, reduce roll stabilization. However, alternatively, compressed rubber bushings may be utilized in the end connections. The transverse member may be thus provided without sacrifice of beam strength, with any desired degree of torsional elasticity and roll stabilizing function. Selections of the wall thickness of the rubber bushings and the hardness of the rubber thereof will result in various desired degrees of torsional stiffness in the transverse member for varying roll stabilization.

These and other objects, features and advantages of the invention will be readily apparent from the following description and from the drawing in which:

FIG. 1 is a perspective schematic view of a rear axle within a vehicle body in normal position (solid lines) and in a position with the body rolled to the left (broken lines), FIG. 2 is a plan view of the left-hand side of the rear axle according to FIG. 1, FIG. 3 is a top view of the left-hand side of another embodiment of the transverse member, and FIG. 4 is a longitudinal section illustrating an alternative mounting of the transverse member in the longitudinal control arms.

Referring to FIG. 1, the rear axle 11 is comprised of longitudinal control arms 12 and 13 and a transverse member 14. Such member 14 is constructed to have substantial strength in bending. It serves as a means of connecting the longitudinal arms to one another in a mid-section area through connections which prevent relative angular displacement, in the vehicle end view, at the points of such connection. The rearward ends of the longitudinal control arms 12 and 13 carry such wheels 15 and 16 by way of wheel spindles 17 and 18, and the forward ends are pivotally mounted to the vehicle chassis 21 by way of rubber bearings 19 and 20.

Preferably, primary suspension springs, not shown, should be of the coil type and should be mounted in the vicinity of the wheels 15 and 16 between the longitudinal control arms 12 and 13 and the vehicle chassis, not illustrated. While employing a beam rigid transverse member 14 between the longitudinal guide arms 12 and 13, the wheels should not loose their facility for a desired degree of independent deflection. Therefore, the transverse member 14 itself must either display sufficient torsional elasticity or, if said transverse member is both flexurally and torsionally rigid, the necessary torsional elasticity between the transverse member 14 and the longitudinal control arms 12 and 13 must be provided in the connecting means 22 and 23 of these elements. Due to the rigid connections between the transverse member 14 and the longitudinal control arms 12 and 13 angular displacement between these elements, in the vehicle end view, is prevented.

By virtue of the flexural or bending strength of transverse member 14 and such angularly stable connection to the longitudinal control arms 12 and 13, the invention not only provides that the longitudinal arms 12 and 13 are prevented from uncontrolled individual lateral deflection, but also, and this is especially true during cornering and the associated roll tendency, that the variation in the camber angle is smaller than the roll angle of the body, which results in improved lateral stability.

If it is desired to have an elastic resistance to be overcome in the course of twisting through the transverse member 14 from the longitudinal control arms 12 and 13, as is experienced during individual deflections of the wheels 15 and 16, a stabilizing effect will be imparted onto the wheels.

As illustrated in FIG. 1, the transverse member 14 is offset in the direction of the wheel axes, and its straight end portions 24 and 25 are connected to the longitudinal control arms 12 and 13 at an oblique angle. The two end portions 24 and 25 are connected to one another by a transversely extending straight middle portion 26. The connection between the transverse member 14 and the longitudinal control arms 12 and 13 may be of a rigid nature, in which case the transverse member, for reasons described earlier, would have to be provided with some torsional elasticity. However, as illustrated in FIG. 2, the connection between the transverse member 14 and the longitudinal control arms 12 and 13 may be in the form of a plain bearing 27 within the mounting sleeve 22 or 23 on the control arm, in which case the transverse member may be very rigid in bending.

The solid lines in FIG. 1 show the position of the rear axle 11 with the wheels 15 and 16 being in an equal or pure ride deflection position. The position of the vehicle body 21 corresponds to the position of the line A between the bearings 19 and 20 of the longitudinal arms 12 and 13.

The broken lines illustrate the vehicle body during leftward roll movement as is experienced during right turn cornering. As a result of the roll, line A has been transposed into line A'. As is readily understood, the transverse beam with its rigid end-view connections limits the camber change at wheels 15 and 16.

By connecting the straight end portions 24 and 25 at an oblique angle to the longitudinal control arms 12 and 13, the wheel carried by the control arm, when subjected to unilateral deflections as during roll, is guided so as to move in combination with the associated guide arm about the longitudinal axis of the adjacent end portion 24 or 25 of the transverse member 14. However, the resultant swinging movement of the wheel about the longitudinal axis of the adjacent end portion 24 or 25 requires that the transverse member 14 be of adequate resiliency or, in the event that the transverse member is torsionally rigid, that torsional elasticity be provided in the sleeve mountings 22 and 23 connecting the transverse member 14 to the longitudinal control arms 12 and 13.

Providing the transverse member 14 with an offset portion in the direction of the wheel axes, and having end portions 24 and 25 attached at an angle generally such as shown to the longitudinal control arms 12 and 13, not only serves to enhance the camber control effect on the wheels 15 and 16, but also has a beneficial effect on the toe-in, similar to that found in arrangements employing obliquely disposed control arms.

In contrast to the embodiment illustrated in FIG. 2, the transverse member illustrated in FIG. 3 has a bow-shaped midsection 26', and the rectilinear end portions 24' and 25' are somewhat longer than those illustrated in FIG. 2.

As illustrated in FIG. 4, the necessary torsional compliance between the transverse member 14 or 14' and the longitudinal control arms 12 and 13 may be provided in having a torsionally rigid tube-like or similar transverse member 14 mounted in bushing assemblies 28 that are welded to the longitudinal guide arms. Rubber bushing sleeves 29 are pressed between the respective ends 24 and 25 of the transverse member 14 and the outer sleeves of the bushing assemblies. The rubber bushings are dimensioned such that maximum angle of twist between these elements is absorbed entirely by molecular displacement. The resistance exerted by the rubber bushings 29 against twisting determines the roll stabilizing effect that is gained by the employment of the transverse member 14. Where such roll control is desired, the rubber-elastic mounting permits the designer to build the necessary rigidity into the transverse member 14 without being restricted on the basis of sufficient torsional elasticity.

The embodiments of the invention in which an exclusive property or privilege is claimed are defined as follows:

1. Rear wheel suspension for automotive vehicles of the type including a pair of longitudinal control arms pivoted at their foward ends on the vehicle body and rotatably mounting adjacent their rearward ends the respective vehicle wheels, and a transverse member adapted for connection at each end thereof to a respective control arm intermediate the ends of the latter in a substantially rigid fashion in the vehicle end view whereby such member controls wheel camber, the improvement which comprises constructing said transverse member with straight end portions and a midportion offset longitudinally of the vehicle body from the transverse plane through the points of connection between said member and the control arms, the axis of each end portion of said member being oriented at said points of connection with the respective control arm at an oblique angle, and means connecting each end of said member with a respective control arm for relative rotation on said axes.

2. Rear wheel suspension for automotive vehicles of the type including a pair of longitudinal control arms pivoted at their forward ends on the vehicle body and rotatably mounting adjacent their rearward ends the respective vehicle wheels, and a transverse member adapted for connection at each end thereof to a respective control arm intermediate the ends of the latter each said connection in a substantially rigid fashion in the vehicle end view whereby such member controls wheel camber, the improvement which comprises constructing said transverse member with straight end portions and a midportion offset rearwardly of the vehicle body from the transverse plane through the points of connection between said member and the control arms, and the axis of each end portion of said member being oriented at said points of connection with the respective control arm at an oblique angle, and means including torsionally elastic bushings connecting each end of said member with a respective control arm for controlled relative rotation on said axes.

3. The improvement of claim 2 wherein said member midportion is straight and extends transversely of the vehicle body.

4. The improvement of claim 2 wherein said member midportion is bow-shaped.

* * * * *